(12) United States Patent
Grunewald et al.

(10) Patent No.: US 10,939,381 B1
(45) Date of Patent: *Mar. 2, 2021

(54) ACCOUNTING FOR BATTERY LEVEL OF A CLIENT DEVICE WHEN SELECTING CONTENT FOR PRESENTATION BY THE CLIENT DEVICE

(71) Applicant: Facebook, Inc., Menlo Park, CA (US)

(72) Inventors: Calvin Patrick Grunewald, Issaquah, WA (US); Greg Schechter, San Francisco, CA (US); Owen H. Coutts, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 84 days.

This patent is subject to a terminal disclaimer.

(21) Appl. No.: 16/395,020

(22) Filed: Apr. 25, 2019

Related U.S. Application Data (63) Continuation of application No. 14/630,619, filed on Feb. 24, 2015, now Pat. No. 10,321,408.

(51) Int. Cl.
*G06Q 30/02* (2012.01)
*H04W 52/02* (2009.01)

(52) U.S. Cl.
CPC .... *H04W 52/0267* (2013.01); *G06Q 30/0267* (2013.01); *Y02D 30/70* (2020.08)

(58) Field of Classification Search
None
See application file for complete search history.

(56) References Cited

U.S. PATENT DOCUMENTS

2011/0238466 A1* 9/2011 Haumont .......... G06Q 30/0241
705/14.4

OTHER PUBLICATIONS

Leontiadis et al, "Don't Kill my ads!: balancing privacy in an ad-supported mobile application market", Feb. 2012, HotMobile '12, Proceeding of the Twelfth Workshop on Mobile Computing Systems and Applications Article No. 2, pp. 1-6 (Year: 2012).*

* cited by examiner

*Primary Examiner* — John Van Bramer
(74) *Attorney, Agent, or Firm* — Fenwick & West LLP (57) ABSTRACT

An online system receives an advertisement ("ad") request identifying an objective for presenting the ad request. The objective specifies a type of interaction with the presented ad request. A threshold battery level is associated with the type of interaction in the ad request that specifies a minimum battery level of a client device to complete the type of interaction. When selecting content for presentation to a user, the online system obtains a battery level of a client device associated with the user and compares the obtained battery level to the threshold battery level. Based on the comparison, the online system determines if to present the ad request to the user. For example, the comparison may prevent presentation of the ad request or penalize a value associated with the ad request if the obtained battery level does not satisfy the threshold battery level.

20 Claims, 2 Drawing Sheets

ACCOUNTING FOR BATTERY LEVEL OF A CLIENT DEVICE WHEN SELECTING CONTENT FOR PRESENTATION BY THE CLIENT DEVICE

CROSS REFERENCE TO RELATED APPLICATIONS

This application is a continuation of co-pending U.S. application Ser. No. 14/630,619, filed Feb. 24, 2015, which is incorporated by reference in its entirety.

BACKGROUND

This disclosure relates generally to presentation of content by an online system, and more specifically to accounting for a battery level of a client device presenting content when selecting content for presentation.

An online system, such as a social networking system, allows its users to connect to and communicate with other online system users. Users may create profiles on an online system that are tied to their identities and include information about the users, such as interests and demographic information. The users may be individuals or entities such as corporations or charities. Because of the increasing popularity of online systems and the increasing amount of user-specific information maintained by online systems, an online system provides an ideal forum for entities, such as retailers or service providers, to increase awareness about products or services by presenting content to online system users.

Presenting content items to online system users allows an entity (e.g., a retailer, a service provider, a restaurant) to gain public attention for products or services or to persuade online users to take an action regarding the entity's products or services. Additionally, many online systems generate revenue by receiving compensation from entities for presenting certain content items to their users. Frequently, online systems charge an entity for each presentation of certain types of content items to an online system user (e.g., each "impression" of the content item) or for each interaction with certain types of content items by an online system user.

An entity may have different objectives for presenting content to a user through an online system. For example, an entity may present certain content items to entice users to request additional information about a product or service provided by the entity and present additional content items to encourage users to install an application provided by the entity. As different objectives for presentation of different content items take different lengths of time and consume different amounts of resources to complete, available resources to a client device on which a content item is presented (e.g., remaining charge in a battery of a client device) influence the effectiveness of presentation of a content item to a user via the client device in completing the objective for presentation of the content item. For example, presenting a content item encouraging a user to install an application on a client device having insufficient charge in its battery to retrieve and install the application prevents a user from accomplishing the objective for presenting the content item. Presenting a user with content items associated with objectives unable to be completed by a client device on which the content item is presented may impair user interaction with content from the online system and inefficiently use resources of an entity by providing content items from the entity to users who are unable to complete the entity's objective for presenting the content item.

SUMMARY

An online system receives an advertisement ("ad") request including ad content, targeting criteria, and one or more objectives. An objective included in the ad request specifies a type of interaction with the ad content. Examples of objectives include: online system users accessing presented ad content (e.g., clicking or otherwise accessing the advertisement), online system users installing an application associated with the ad content, online system users expressing a preference for a page associated with the ad content (i.e., "liking" the page), online system users viewing a page associated with the ad content or with the ad campaign, or any other suitable action by online system users. In some embodiments, the ad request also includes a threshold battery level associated with one or more of the objectives by an advertiser from which the ad request was received. The threshold battery level identifies a minimum battery level to complete the type of interaction specified by an objective.

Based at least in part on the targeting criteria included in the ad request, the online system identifies a user of the online system eligible to be presented with the ad content from the ad request. The user is associated with at least a threshold number of characteristics satisfying the targeting criteria included in the ad request. The online system 140 associates different objectives included in an ad request with different threshold battery levels, which may correspond to the type of interaction with ad content in the ad request specified by the ad request. For example, an objective of installing an application associated with ad content in an ad request is associated with a threshold battery level of 15% to allow installation of the application using the client device. As another example, an objective of accessing the ad content (e.g., clicking or tapping on the ad content) is associated with a threshold battery level of 3%, as fewer resources of the client device are used to complete the objective of accessing the ad content.

The threshold battery level associated with an objective may be determined based at least in part on a client device on which the ad content is to be presented. For example, different threshold battery levels are associated with an objective, allowing association of different threshold battery levels with different types of client devices or with client devices having different characteristics. In some embodiments, a threshold battery level associated with an objective and with a type of client device is based on an average amount of battery level depleted on a specified number of client devices having the type when the interaction specified by the objective was performed. For example, if a battery level of a specified number (e.g., 1,500) of a specific type of client device was depleted an average of 7% when installing an application identified by ad content, an objective of installing the application is associated with a threshold battery level of 7% when performed on the specific type of client device. Any suitable value may be used to identify the threshold battery level. For example, the threshold battery level for an objective is an estimated time remaining before a battery of a client device is discharged determined based on an average time for client devices having one or more common characteristics or having a specific type to complete a type of interaction specified by the objective.

The online system also obtains information describing a battery level of a client device associated with the user on which content is to be presented. For example, the online system identifies the client device from a request for content received from the user and determines a battery level of the client device. In some embodiments, the online system requests the battery level from the client device. Alternatively, the online system retrieves information maintained by the online system and associated with the client device. For example, the online system periodically retrieves battery level information from the client device and stores the retrieved battery level information in a user profile of the user associated with the client device. In some embodiments, the online system determines the battery level of the client device as an estimated time until a battery of the client device is discharged based on an amount of charge in the battery and contextual information associated with the client device. Contextual information associated with the client device describes operating characteristics of the client device. Examples of contextual information include a type of connection between the client device and a network (e.g., a 3G connection, a 4G connection, a wireless local area network connection, etc.), one or more display settings of the client device (e.g., a brightness of a display device used by the client device), a type of the client device, a number of applications executing on the client device, a location of the client device, and a type of processor included in the client device.

To select content for presentation to the user, the online system compares the battery level of the client device associated with the user to a threshold battery level associated with an objective included in the ad request. Subject to the comparison, the online system performs one or more selection processes to select content for presentation to the user. In some embodiments, the online system excludes the ad request from a selection process if the battery level of the client device does not satisfy the threshold battery level associated with the objective (e.g., if the battery level of the client device is less than the threshold battery level associated with the objective). Alternatively, the online system modifies a likelihood of the user interacting with the ad content from the ad request based on the comparison when performing the selection process. For example, the likelihood of the user interacting with the ad content is reduced by a value if the battery level associated with the client device does not satisfy the battery level associated with the objective.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
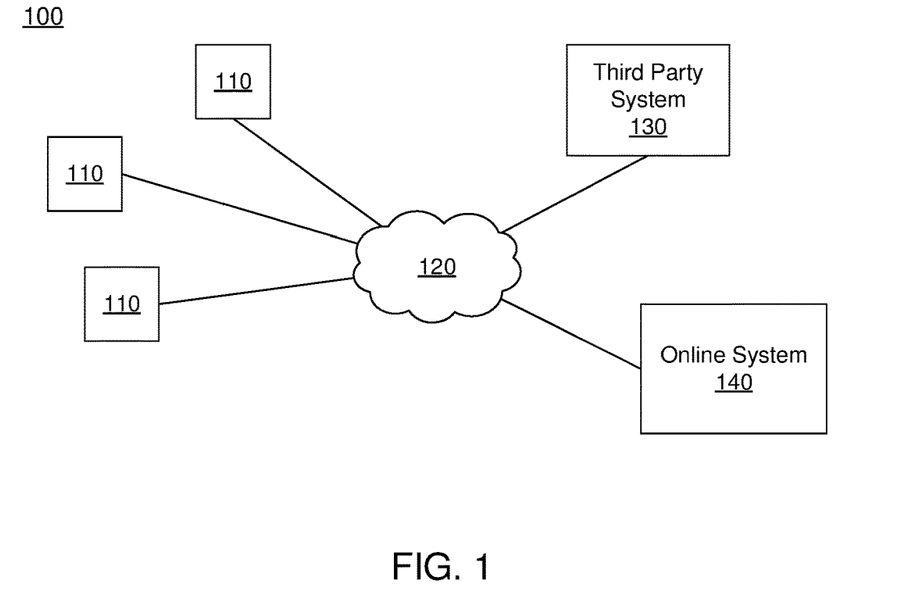
FIG. 1 is a block diagram of a system environment in which an online system operates, in accordance with an embodiment.

FIG. 1 is a block diagram of a system environment 100 for an online system 140, such as a social networking system. The system environment 100 shown by FIG. 1 comprises one or more client devices 110, a network 120, one or more third-party systems 130, and the online system 140. In alternative configurations, different and/or additional components may be included in the system environment 100. The embodiments described herein can be adapted to social networking systems as well.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
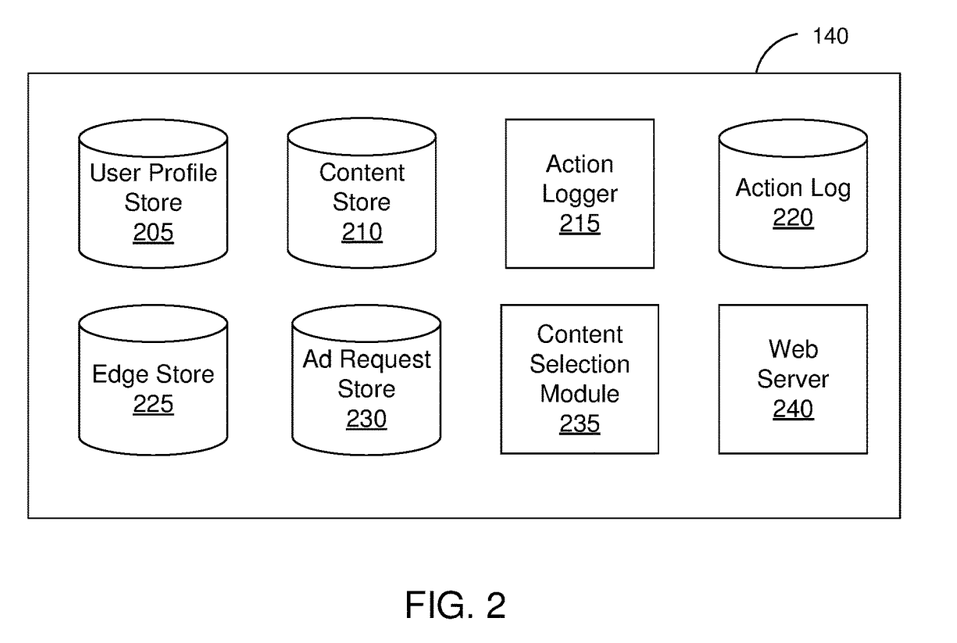
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, an advertisement ("ad") request store 230, a content selection module 235, and a web server 240. In other embodiments, the online system 140 may include additional, fewer, or different components for various applications. Conventional components such as network interfaces, security functions, load balancers, failover servers, management and network operations consoles, and the like are not shown so as to not obscure the details of the system architecture. In one embodiment, the online system 140 is a social networking system.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system using a brand page associated with the entity's user profile. Other users of the online system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

Certain objects in the content store 210 may be identified as associated with one or more applications. For example, an object associated with an application is an advertisement identifying the application. As another example, an object associated with a gaming application is a web page describing the gaming application. The web page may include a link for purchasing the gaming application, an image showing the gaming application, text describing installation or use of the gaming application, etc. Alternatively and additionally, an object related to an application may be group associated with the application and including one or more users of the online system 140. As another example, an object identifies an item for use within the application as well as a price specifying an amount of compensation to a third party system 130 associated with the application to allow a user to use the item when interacting with the application. For example, an object identifies a virtual currency spent within an application to provide a user with additional features as well as an amount of actual currency provided to a third party system 130 associated with the application to obtain the virtual currency. However, any other suitable type of object may be associated with an application and maintained in the content store 210. For example, content posted to the online system 140 identifying an application or relating to the application is identified as associated with the application or an invitation related to the application are identified as associated with the application. In various embodiments, an application identifier specifying an application is associated with an object associated with the application to allow the online system 140 to identify objects associated with the application.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate a user's interest in an object, a topic, or another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

One or more advertisement ("ad") requests are included in the ad store 230. An ad request is received from an advertiser for presentation to users of the online system 140 and the ad request may be included in an advertisement campaign ("ad campaign") by the advertiser. Each ad request includes advertisement content ("ad content"), which is ad content presented to an online system user. Ad content may be text data, image data, audio data, video data, or any other suitable data. Additionally, ad content may include a link or destination address associated with a source of content associated with the ad request that is presented to the user if the user accesses the ad content when it is presented. For example, the destination address identifies a landing page including content that is presented to the user when the user accesses the ad content. Ad content may also include one or more prompts for performing an action that comprise information identifying the action and instructions that, when executed, perform the action. A prompt for purchasing a product comprises text or image data describing the purchasing and instructions that, when executed, request payment information from a user accessing the prompt. As further described below in conjunction with FIG. 3, ad content included in an ad request may include a prompt for purchasing an item for use within an application that requests payment information from the user when an interaction with the prompt is received, allowing the user to purchase the item by interacting with the prompt.

Additionally, an ad request include a bid amount specifying an amount of compensation an advertiser associated with the ad request provides the online system 140 for presenting the ad content, for a user interacting with presented ad content, or for another suitable interaction with presented ad content by a user. Based on the bid amount included in an ad request, the online system 140 determines an expected value for presenting ad content in the ad request to a user. For example, the expected value is an amount of monetary compensation received by the online system 140 from an advertiser for presenting the advertisement to a user, for a user interacting with the presented ad content, or based on any other suitable condition. In one embodiment, the expected value of an ad request is a product of the bid amount and a probability of the ad content of the ad request being accessed by the user if presented.

A bid amount associated with an ad request may be based on a type associated with the ad request. The type associated with an ad request may be based at least in part on the format with which ad content included in the ad request is displayed or the type of information presented by the ad content. For example, a type of ad request includes ad content describing a single product or service. Another type of ad request includes ad content describing multiple products or services. Another type of ad request may include multiple components of ad content and an order in which the various components are presented to a user. As another example, an ad request may include one or more prompts for performing an action that are presented along with ad content, such as video data, to encourage to perform actions identified by the one or more prompts; a prompt for performing an action includes information identifying an action and instructions that, when executed, perform the identified action. A bid amount associated with an ad request may be proportional to the amount of different content included in the ad content. For example, a higher bid amount is associated with an ad request including ad content describing multiple products or services than is associated with an ad request including ad content describing a single product or service.

Additionally, ad requests may be associated with one or more targeting criteria. An advertiser may specify targeting criteria associated with an ad request or may specify targeting criteria associated with multiple ad requests included in an ad campaign. Targeting criteria specify one or more characteristics of users eligible to be presented with an ad content included in an ad request associated with the targeting criteria. Associating different targeting criteria with different ad requests allows an advertiser to tailor presentation of ad content to users having specific characteristics, allowing ad requests including different ad content to be presented to users with different characteristics. For example targeting criteria specify demographic information, connections, or actions associated with a user. In some embodiments, targeting criteria may be associated with an ad campaign in its entirety, so multiple ad requests in the ad campaign are associated with the targeting criteria.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sending a message to another user, using an application, joining a group, leaving a group, joining an event, generating an event description, purchasing or reviewing a product or service using an online marketplace, requesting information from a third-party system 130, or any other suitable action. Including actions in targeting criteria allows advertisers to further refine users eligible to be presented with ad content from various ad requests. As another example, targeting criteria identifies users having a connection to another user or object or having a particular type of connection to another user or object.

Additionally, an ad request may include an objective specifying a goal of the advertiser for presentation of the ad content in the ad request to online system users. The objective may also be associated with an ad campaign including the ad request to specify a goal of the advertiser for other ad requests in the ad campaign as well as the ad request. For example, the objective identifies a type of interaction with ad content from ad requests included in the ad campaign or with one or more objects associated with ad requests in the ad campaign by online system users presented with ad content from the ad campaign. Examples of objectives include: online system users accessing presented ad content (e.g., clicking or otherwise accessing the advertisement), online system users installing an application associated with the ad content, online system users expressing a preference for a page associated with the ad content (i.e., "liking" the page), online system users viewing a page associated with the ad content or with the ad campaign, or any other suitable action by online system users. In one embodiment, the objective is selected from a set of objectives maintained by the online system 140.

Additional information may be associated with an ad request or with the ad campaign including the ad request. For example, the ad request or ad campaign includes a budget that specifies a total amount of compensation an advertiser provides the online system 140 for presenting ad content included in the ad request or included in ad requests associated with an ad campaign. The budget may be allocated for the ad campaign as a whole or per ad request. In addition, the advertiser may specify instructions for allocating the budget among various ad requests in the ad campaign. For example, the instructions specify modification of a bid amount associated with an ad request included in the ad campaign based on one or more criteria. The instructions may also include other suitable information describing allocation of a budget among ad requests included in the ad campaign.

The content selection module 235 selects one or more content items for communication to a client device 110 to be presented to a viewing user. Content items eligible for presentation to the viewing user are retrieved from the content store 210, or from another source, by the content selection module 235, which selects one or more of the content items for presentation to the viewing user. A content item eligible for presentation to the viewing user is a content item associated with at least a threshold number of targeting criteria satisfied by characteristics of the viewing user or is a content item that is not associated with targeting criteria. In various embodiments, the content selection module 235 includes content items eligible for presentation to the viewing user in one or more selection processes, which identify a set of content items for presentation to the viewing user. For example, the content selection module 235 determines a measure of relevance of various content items to the user based on characteristics associated with the user by the social networking system 140 based on the user's affinity for different content items and selects content items for presentation to the user based on the determined measures of relevance. As an additional example, the content selection module 235 selects content items having the highest measures of relevance or having at least a threshold measure of relevance for presentation to the user. Alternatively, the content selection module 235 ranks content items based on their associated measures of relevance and selects content items having the highest positions in the ranking or having at least a threshold position in the ranking for presentation to the user.

Content items selected for presentation to the user may include ad requests or other content items associated with bid amounts. The content selection module 235 uses the bid amounts associated with various content items when selecting content for presentation to the viewing user. In various embodiments, the content selection module 235 determines an expected value associated with various content items based on their bid amounts and selects content items associated with a maximum expected value or associated with at least a threshold expected value for presentation. An expected value associated with a content item represents an expected amount of compensation to the social networking system 140 for presenting a content item. For example, the expected value associated with an ad request is a product of the ad request's bid amount and a likelihood of the user interacting with the ad content from the ad request. The content selection module 235 may rank ad requests based on their associated expected values and select ad requests having at least a threshold position in the ranking for presentation to the user. In some embodiments, the content selection module 235 may rank both content items and ad requests in a unified ranking based on bid amounts associated with ad requests and measures of relevance associated with content items and ad requests. Based on the unified ranking, the content selection module 235 selects content for presentation to the user. Selecting ad requests and other content items through a unified ranking is further described in U.S. patent application Ser. No. 13/545,266, filed on Jul. 10, 2012, which is hereby incorporated by reference in its entirety.

When determining a likelihood of a user interacting with an ad request, the content selection module 235 may account for a battery level of a client device 110 associated with the user to who content is to be presented and an objective included in the ad request. The online system 140 associates different objectives included in an ad request with different threshold battery levels, which may correspond to the type of interaction with ad content in the ad request specified by the ad request. A threshold battery level associated with an objective indicates a minimum battery level for a user to perform the type of interaction specified by the objective using the client device 110. For example, an objective of installing an application associated with ad content in an ad request is associated with a threshold battery level of 15% so the client device 110 used to present the ad content has a sufficient battery level to allow the user to complete the objective; in contrast, an objective of accessing the ad content (e.g., clicking or tapping on the ad content) is associated with a threshold battery level of 3%, as fewer resources of the client device 110 are used to satisfy the objective of accessing the ad content. The threshold battery level associated with an objective may be determined based at least in part on a client device 110 on which the ad content is to be presented. For example, different threshold battery levels are associated with an objective, so different threshold battery levels are associated with different types of client devices 110. A threshold battery level associated with an objective and with a type of client device 110 may be based on an average amount of battery level depleted on a specified number of client devices 110 having the type when the interaction specified by the objective was performed. For example, if a battery level of a specified number (e.g., 1,000) of a specific type of client device 110 was reduced an average of 5% when installing an application identified by ad content, an objective of installing the application is associated with a threshold battery level of 5% when performed on the specific type of client device 110. The content selection module 235 may maintain information associating objectives with threshold battery levels based on a type of objective (and also based on a type of client device 110) in various embodiments. Alternatively, the ad request includes a threshold battery level associated with an objective. While the preceding examples describe the threshold battery level as a percentage, in other embodiments, any suitable value may be used to identify the threshold battery level. For example, the threshold battery level for an objective is an estimated time remaining before a battery of a client device 110 is discharged determined based on an average time for client devices 110 having one or more common characteristics or having a specific type to complete a type of interaction specified by the objective. The estimated time may be determined based at least in part on contextual information associated with the client device 110 associated with the user, as further described below in conjunction with FIG. 3.

If the content selection module 235 determines a user satisfies at least a threshold number of targeting criteria included in an ad request, the content selection module 235 determines a battery level of a client device 110 associated with the user on which content is to be presented. For example, the content selection module 235 determines information identifying the client device 110 from a request for content received from the user and determines a battery level of the client device 110. The content selection module 235 may request the battery level from the client device 110 or may retrieve information maintained by the online system 140 and associated with the client device 110 (e.g., the online system 140 periodically retrieves battery level information from the client device 110 and stores the retrieved battery level information in a user profile of the user associated with the client device 110). As further described below in conjunction with FIG. 3, the content selection module 235 compares the battery level of the client device 110 associated with the user to a threshold battery level associated with an objective included in the ad request. Subject to the comparison, the content selection module 235 performs one or more selection processes to select content for presentation to the user. In some embodiments, the content selection module 235 excludes the ad request from a selection process if the battery level of the client device 110 does not satisfy the threshold battery level associated with the objective (e.g., if the battery level of the client device 110 is less than the threshold battery level associated with the objective). Alternatively, the content selection module 235 modifies a likelihood of the user interacting with the ad content from the ad request based on the comparison when performing the selection process. For example, the likelihood of the user interacting with the ad content is reduced by a value if the battery level associated with the client device 110 does not satisfy the battery level associated with the objective. Modifying a selection process based on a comparison of a battery level of a client device 110 presenting content and a threshold battery level associated with an objective of an ad request is further described below in conjunction with FIG. 3.

In various embodiments, the content selection module 235 presents content to a user through a feed including multiple content items. For example, the feed includes content items describing actions performed by users of the online system 140 as well as ad content from one or more ad requests selected for presentation to a user. The content selection module 235 may also determine the order in which selected content items or advertisements are presented via the feed. For example, the content selection module 235 orders content items or advertisements in the feed based on likelihoods of the user interacting with various content items or ad requests.

The web server 240 links the online system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, WEBOS® or BlackberryOS.

Figure 3:
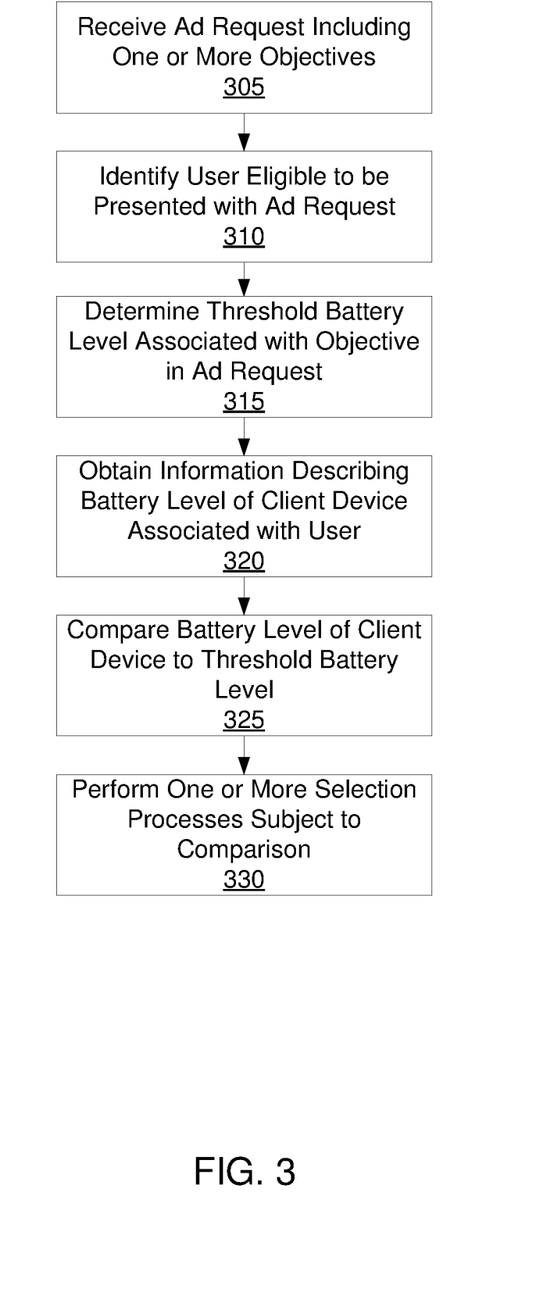
FIG. 3 is a flowchart of a method for determining whether to present an advertisement ("ad") to an online system user based at least in part on a battery level of a client device associated with the online system user, in accordance with an embodiment.

Selecting Advertisement Requests Based on Battery Level of a User's Client Device FIG. 3 is a flowchart of a method for determining whether to present an advertisement ("ad") to an online system user based at least in part on a battery level of a client device 110 associated with the online system user. In other embodiments, the method may include different and/or additional steps than those shown in FIG. 3. Additionally, steps of the method may be performed in different orders than the order described in conjunction with FIG. 3.

The online system 140 receives 305 an advertisement ("ad") request including ad content, targeting criteria, and one or more objectives. An objective included in the ad request specifies a type of interaction with the ad content. Examples of objectives include: online system users accessing presented ad content (e.g., clicking or otherwise accessing the advertisement), online system users installing an application associated with the ad content, online system users expressing a preference for a page associated with the ad content (i.e., "liking" the page), online system users viewing a page associated with the ad content or with the ad campaign, or any other suitable action by online system users. In some embodiments, the ad request also includes a threshold battery level associated with one or more of the objectives by an advertiser from which the ad request was received.

Based on the targeting criteria included in the ad request and characteristics associated with online system users, the online system 140 identifies 310 a user of the online system 140 eligible to be presented with the ad content included in the ad request. For example, a user associated with at least a threshold number of characteristics satisfying the targeting criteria in the ad request is identified as eligible to be presented with the ad content from the ad request. Example characteristics included in targeting criteria are described above in conjunction with FIG. 2.

The online system 140 determines 315 a threshold battery level associated with an objective included in the ad request. A threshold battery level associated with an objective indicates a minimum battery level of a client device 110 for a user to perform the type of interaction specified by the objective using the client device 110. For example, an objective of installing an application associated with ad content in an ad request is associated with a threshold battery level of 10% so the client device 110 used to present the ad content has a sufficient battery level to allow completion of the objective; in contract, an objective of accessing the ad content (e.g., clicking or tapping on the ad content) is associated with a threshold battery level of 3%, as fewer resources of the client device 110 are consumed by the client device 110 to complete the objective of accessing the ad content. In embodiments where the ad request includes threshold battery levels associated with one or more objectives, the online system 140 retrieves the threshold battery level from the ad request. For example, the online system 140 retrieves a threshold battery level associated with an objective from the ad request.

In other embodiments, the online system 140 maintains information associating different objectives included in an ad request with different threshold battery levels. A threshold battery level associated with an objective may be determined by the online system 140 based at least in part on a client device 110 on which the ad content is to be presented. For example, different threshold battery levels, each associated with client devices 110 having different types or having different common characteristics, are associated with an objective. For example, when determining 315 a threshold battery level associated with an objective, the online system 140 identifies and objective from the ad request and identifies a type of the client device 110 on which the ad content is to be presented or determines characteristics of the client device 110 on which the ad content is to be presented. The online system 140 identifies a threshold battery level associated with the objective and associated with the type of client device 110 on which the ad content is to be presented or a threshold battery level associated with the objective and associated with a client device 110 having at least a threshold number or percentage of characteristics matching characteristics of the client device 110 on which the ad content is to be presented. In various embodiments, the online system 140 determines characteristics of the client device 110 on which the ad content is to be presented or the type of the client device 110 on which the ad content is to be presented based on information included in a user profile associated with the user describing the client device 110 associated with the user.

A threshold battery level associated with an objective and with a type of client device 110 (or with client devices 110 having one or more characteristics) may be based on an average amount of battery level depleted on a specified number of client devices 110 having the type (or having at least a threshold number or percentage of characteristics matching characteristics of the client device 110 on which the ad content is to be presented) when the interaction specified by the objective was performed by the threshold number of client devices 110. For example, if a battery level of a specified number (e.g., 1,000) of a specific type of client device 110 was reduced an average of 5% when installing an application identified by ad content, an objective of installing the application is associated with a threshold battery level of 5% when performed on the specific type of client device 110. While the preceding examples describe the threshold battery level associated with an objective as a percentage, in other embodiments, any suitable value may be used to identify the threshold battery level. For example, the threshold battery level is a minimum estimated time remaining before a battery of a client device 110 is discharged to complete the type of interaction associated with the objective. The minimum estimated time may be determined as an average time for a specified number of client devices 110 of a type or having one or more characteristics to complete the type of interaction or may be determined through any other suitable process.

The online system 140 obtains 320 information describing a battery level of a client device 110 associated with the user. In some embodiments, the client device 110 associated with the user is identified by the online system 140 from a request for content received from the client device 110. Alternatively, the online system 140 retrieves information from a user profile associated with the user identifying a client device 110 associated with the user. To obtain 320 the information describing the battery level of the client device 110 associated with the user, the online system 140 communicates a request for the battery level of the client device 110 associated with the user, which retrieves its battery level (through one or more processes executing on an operating system or other application executing on the client device 110) and communicates the battery level to the online system 140. For example, the client device 110 communicates an indication of the percentage of its battery that is charged to the online system 140 after receiving a request for battery level from the online system 140. As another example, the client device 110 communicates an estimated time until its battery is discharged to the online system 140 after receiving a request for the battery level of the client device 110 from the online system 140. In other embodiments, the online system 140 periodically requests information describing the battery level of the client device 110 and stores battery level information received from the client device 110 in a user profile associated with the user associated with the client device 110.

The client device 110 may determine the estimated time until its battery is discharged based on contextual information associated with the client device 110 and an amount of charge in the battery. Contextual information associated with the client device 110 describes operating characteristics of the client device 110. Examples of contextual information include a type of connection between the client device 110 and a network 120 (e.g., a 3G connection, a 4G connection, a wireless local area network connection, etc.), one or more display settings of the client device 110 (e.g., a brightness of a display device used by the client device 110), a type of the client device 110, a number of applications executing on the client device 110, a location of the client device 110, and a type of processor included in the client device 110.

In other embodiments, the online system 140 identifies the contextual information associated with the client device 110 and determines the battery level from the contextual information. For example, the online system 140 retrieves contextual information from the client device 110 as well as an amount of charge stored in the battery of the client device 110 and determines an estimated time until the battery of the client device 110 is discharged based on the amount of charge stored in the battery of the client device 110 and the contextual information associated with the client device. The online system 140 may apply one or more models trained based on battery discharge of additional client devices 110 having at least a threshold number of characteristics matching characteristics of the client devices 110. In some embodiments, prior usage of the client device 110 associated with the user may be used by the online system 140 to determine the battery level of the client device 110 associated with the user. For example, the online system 140 maintains information describing prior usage of the client device 110 associated with the user over time and/or at different locations by the user (e.g., an amount of data received by the client device 110 at different times or at different locations, a number or a frequency of requests for content from the client device 110 at different times or at different locations, etc.) and accounts for a location of the client device 110 or wireless signal strength currently measured by the client device 110 associated with the user or a time of day to determine an estimated time until the battery of the client device 110 is discharged or to determine other information describing the battery level of the client device 110.

The online system 140 compares 325 the battery level of the client device 110 associated with the user to the threshold battery level associated with the objective included in the ad request and performs 330 one or more selection processes to select content for presentation to the user subject to the comparison. In some embodiments, the online system 140 excludes the ad request from a selection process if the comparison indicates the battery level of the client device 110 associated with the user does not satisfy the threshold battery level associated with the objective (e.g., if the battery level of the client device 110 is less than the threshold battery level associated with the objective). Similarly, the online system 140 includes the ad request in a selection process if the comparison indicates the battery level of the client device 110 associated with the user satisfies the threshold battery level associated with the objective (e.g., if the battery level of the client device 110 equals or exceeds the threshold battery level associated with the objective).

Alternatively, the online system 140 includes the ad request in a selection process that determines a likelihood of the user interacting with the ad content and modifies the likelihood of the user interacting with the ad content based on the comparison. For example, the selection process reduces the likelihood of the user interacting with the ad content by a value if the battery level associated with the client device 110 does not satisfy the battery level associated with the objective (e.g., if the battery level associated with the client device 110 is less than the threshold battery level).

In some embodiments, the value by which the likelihood of the user interacting with the ad content is reduced increases based on an amount by which the battery level of the client device 110 associated with the user does not satisfy the threshold battery level associated with the objective (e.g., an amount by which the battery level of the client device 110 is less than the threshold battery level associated with the objective). The selection process then ranks content, including the ad request, based on the likelihoods of the user interacting with various content items and selects content having at least a threshold likelihood of user interaction for presentation to the user via the client device 110 associated with the user. Hence, if the battery level of the client device 110 does not satisfy the threshold battery level associated with the objective of the ad request, the selection process penalizes the ad request, reducing the likelihood of the ad request being selected for presentation to the user.

In alternative embodiments, the online system 140 determines 315 the threshold battery level associated with the objective from the ad request and determines 320 the battery level of the client device 110 associated with the user when identifying 310 the user eligible for presentation with ad content from the ad request. For example, if the battery level of the client device 110 associated with the user does not satisfy the threshold battery level associated with the objective, the online system 140 determines the user is ineligible to be presented with ad content from the ad request. This allows the online system 140 to identify the user as ineligible to be presented with ad content from the ad request, so the subsequent selection process does not include ad requests having objectives associated with threshold battery levels exceeding the battery level of the client device 110 associated with the user.

While FIGS. 2 and 3 describe selection of ad requests for presentation to a user via a client device 110 based on a battery level of a client device 110 on which the ad requests are to be presented and objectives associated with the ad requests, in other embodiments, the online system 140 may select content items based in part on the battery level of the client device 110 on which content items are presented. In some embodiments, objectives are associated with various content items and threshold battery levels are associated with the objectives, as described above. In other embodiments, threshold battery levels are associated with various types of content included in content items (e.g., video data, image data, text data, etc.), and the online system 140 associates a threshold battery level with a type of content item. As described above, the online system 140 may determine the user is eligible to be presented with a content item based on characteristics of the user and characteristics of the content item and determine whether a battery level of a client device 110 associated with the user satisfies the threshold battery level associated with the content item. As described above in conjunction with FIG. 3, the online system 140 then performs one or more selection processes based at least in part on the comparison. Alternatively, when determining if the user is eligible to be presented with the content item, the online system 140 obtains a battery level of the client device 110 associated with the user and compares the battery level to the threshold battery level associated with the content item. If the battery level of the client device 110 does not satisfy the threshold battery level associated with the content item, the online system 140 determines the user is ineligible to be presented with the content item.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   maintaining, at an online system, an advertisement ("ad") request including ad content and two or more content options for presenting the ad content to a user, each content option specifying a different type of interaction with the ad content on a client device and being associated with a different range of battery levels of the client device, each range of battery levels corresponding to battery levels of the client device sufficient for presenting the ad content to a user;
   obtaining, at the online system, information describing a battery level of a client device associated with a user of the online system to be presented to the ad content of the ad request;
   determining, at the online system, that the battery level of the client device falls within a first range of battery levels for a first content option of the two or more content options as required by the ad content of the ad request; and
   responsive to determining that the battery level of the client device falls within the first range of battery levels for the first content option, generating, at the online system, the ad content for the first content option for presentation on the client device of the user.

2. The method of claim 1, wherein each content option is associated with a threshold battery level indicating a minimum battery level for a user to perform the type of interaction specified by the content option.

3. The method of claim 2, wherein the threshold battery level is one of the following:
   a percentage of a battery associated with a client device; or
   an estimated amount of time remaining before the battery associated with the client device is discharged.

4. The method of claim 1, wherein the interaction associated with a first content option includes installing an application associated with the ad request and the interaction with a second content option includes accessing the ad request.

5. The method of claim 1, wherein the different types of interactions associated with a different range of battery levels of the client device include:
   accessing content associated with an ad request;
   installing an application associated with an ad request; and
   viewing a page associated with an ad request.

6. The method of claim 1, further comprising:
   for a specific type of client device, measuring an amount of battery depleted when presenting each content option to a user;
   averaging the amount of battery consumed across a plurality of client devices of the same type; and
   determining, for each content option, a range of battery levels associated with the content option for the specific type of client device based on the average amount of battery consumed.

7. The method of claim 6, further comprising:
   accessing contextual information describing operating characteristics of the client device; and
   applying the contextual information and operating characteristics to a trained model to determine a current battery level of the client device.

8. A computer program product comprising a computer readable storage medium having instructions encoded thereon that, when executed by a processor, cause the processor to:
   maintain, at an online system, an advertisement ("ad") request including ad content and two or more content options for presenting the ad content to a user, each content option specifying a different type of interaction with the ad content on a client device and being associated with a different range of battery levels of the client device, each range of battery levels corresponding to battery levels of the client device sufficient for presenting the ad content to a user;

obtain, at the online system, information describing a battery level of a client device associated with a user of the online system to be presented to the ad content of the ad request;

determine, at the online system, that the battery level of the client device falls within a first range of battery levels for a first content option of the two or more content options as required by the ad content of the ad request; and responsive to determining that the battery level of the client device falls within the first range of battery levels for the first content option, generate, at the online system, the ad content for the first content option for presentation on the client device of the user.

9. The computer program product of claim 8, wherein each content option is associated with a threshold battery level indicating a minimum battery level for a user to perform the type of interaction specified by the content option.

10. The computer program product of claim 9, wherein the threshold battery level is one of the following:
   a percentage of a battery associated with a client device; or
   an estimated amount of time remaining before the battery associated with the client device is discharged.

11. The computer program product of claim 8, wherein the interaction associated with a first content option includes installing an application associated with the ad request and the interaction with a second content option includes accessing the ad request.

12. The computer program product of claim 8, wherein the different types of interactions associated with a different range of battery levels of the client device include:
   accessing content associated with an ad request;
   installing an application associated with an ad request; and
   viewing a page associated with an ad request.

13. The computer program product of claim 8, further comprising instructions that cause the processor to:
   for a specific type of client device, measure an amount of battery depleted when presenting each content option to a user;
   average the amount of battery consumed across a plurality of client devices of the same type; and
   determine, for each content option, a range of battery levels associated with the content option for the specific type of client device based on the average amount of battery consumed.

14. The computer program product of claim 13, further comprising instructions that cause the processor to:
   access contextual information describing operating characteristics of the client device; and
   apply the contextual information and operating characteristics to a trained model to determine a current battery level of the client device.

15. A computer program product comprising a computer readable storage medium having instructions encoded thereon that, when executed by a processor, cause the processor to:
   receive, at an online system, an advertisement ("ad") request including ad content and two or more objectives associated with the ad content, each objective specifying a different type of interaction with the ad content on a client device and being associated with a different range of battery levels of the client device, each range of battery levels corresponding to battery levels of the client device sufficient for performing the type of interaction;
   obtain, at the online system, information describing a battery level of a client device associated with a user of the online system to be presented the ad content of the ad request;
   determine, at the online system, that the battery level of the client device falls within a first range of battery levels for a first objective of the two or more objectives as required by the ad content of the ad request;
   responsive to determining that the battery level of the client device falls within the first range of battery levels for the first objective, generate, at the online system, the ad content for the first objective specifying a first type of interaction with the ad content; and
   provide, by the online system, the ad content for the first objective for presentation on the client device to the user of the online system.

16. The computer program product of claim 15, further comprising instructions to:
   determine a likelihood of the user interacting with the ad content;
   modify the likelihood of the user interacting with the ad content included in the ad request based at least in part on the ad content for the first objective.

17. The computer program product of claim 15, wherein instructions to obtain the information describing the battery level of the client device further comprise:
   identify the client device associated with the user; and
   determine the different range of battery levels for each objective based on a type of the client device associated with the user.

18. The computer program product of claim 15, wherein each range of batter levels associated with each objective comprises an average amount of battery level depleted on a specified number of client devices having at least a threshold number of characteristics matching characteristics of the client device to perform the type of interaction specified by the objective.

19. The computer program product of claim 15, wherein instructions to obtain information describing the battery level of the client device associated with the user further comprise:
   identify contextual information associated with the client device; and
   determine an estimated time remaining before a battery of the client device is discharged based at least in part on the contextual information associated with the client device.

20. The computer program product of claim 15, wherein instructions to obtain information describing the battery level of the client device associated with the user further comprise:
   request the battery level from the client device associated with the user; and
   receive the battery level from the client device associated with the user.

* * * * *